Nov. 7, 1961  E. A. VIALE ET AL  3,007,493
PILOT VALVE ASSEMBLY
Filed Oct. 6, 1958  2 Sheets-Sheet 2
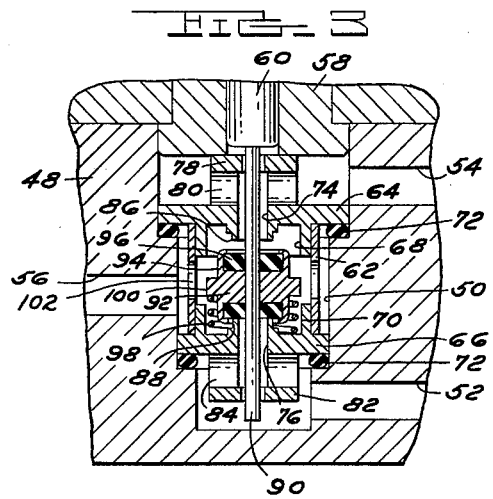
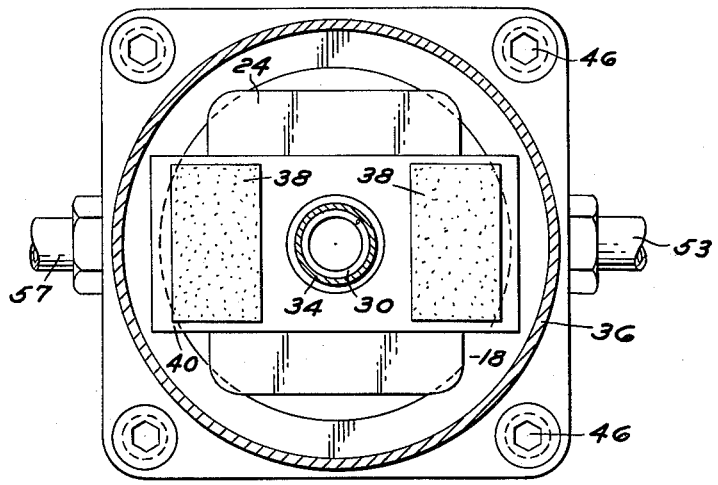
INVENTORS
EDMOND A. VIALE
LOUIS R. CONRATH
BY
Burton & Parker
ATTORNEYS 3,007,493
Patented Nov. 7, 1961

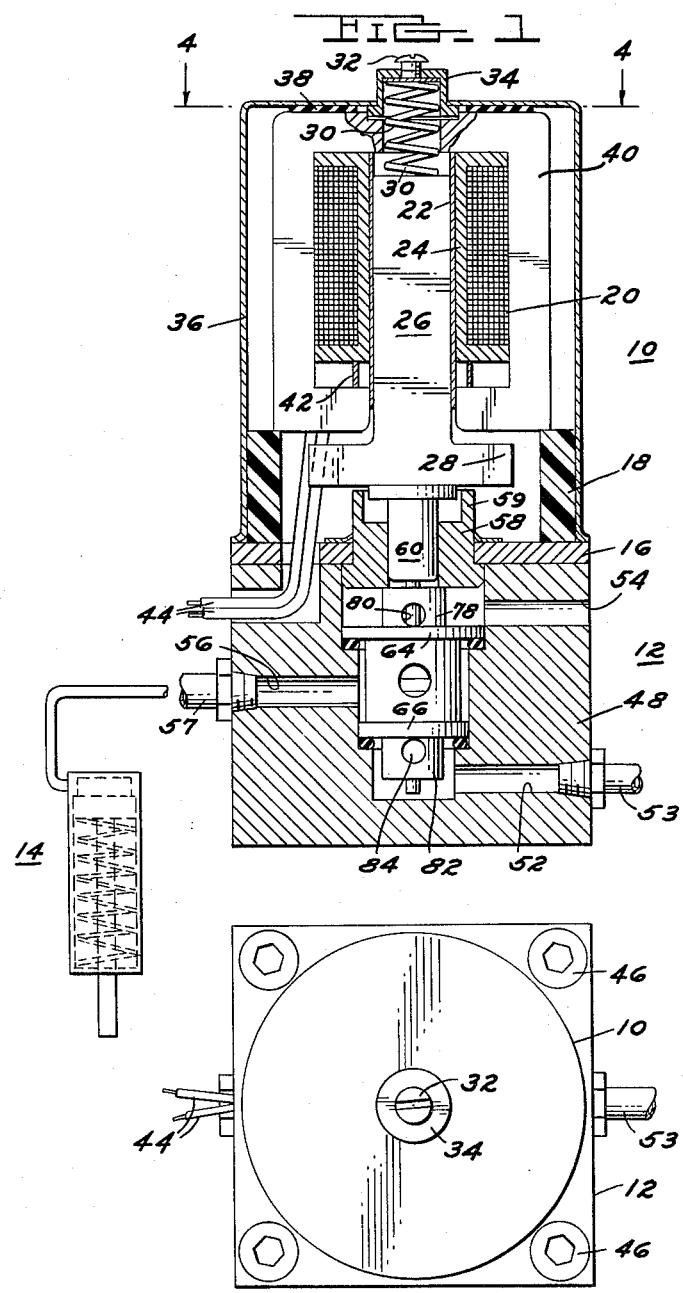

3,007,493
PILOT VALVE ASSEMBLY
Edmond A. Viale, Southfield Township, and Louis R. Conrath, Huntington Woods, Mich., assignors to Detroit Coil Company, Ferndale, Mich., a corporation of Michigan
Filed Oct. 6, 1958, Ser. No. 765,532
14 Claims. (Cl. 137—623)

This invention relates to an improved pilot valve assembly.

An object is to provide an improved pilot valve capable of being coupled with the solenoid so that the pilot valve responds to reciprocation of the solenoid plunger to control the flow of fluid under pressure from a source of fluid pressure to a part or device adapted to be actuated by said fluid pressure.

More particularly an object is to provide a pilot valve of the character specified which is simple, inexpensive, and lightweight and responsive to a solenoid which is simple, inexpensive, and of light weight and which solenoid is responsive to a very low power rate, as, for example 2 watts.

The construction of the assembly is such that the pilot valve is so coupled with the solenoid plunger as to respond to projection of the plunger by its actuating spring to close the pilot valve. Upon energization of the solenoid and withdrawal of the solenoid plunger from its projected position, the pilot valve responds to fluid pressure and/or its own pilot valve spring to open and permit discharge of fluid under pressure to a part to be actuated by such fluid pressure.

In other words all the solenoid is required to do upon its energization is to move its plunger out of the way of the pilot valve. The fluid pressure acting upon the pilot valve causes the pilot valve to follow the withdrawal of the solenoid plunger and open.

The pilot valve is a lightweight poppet type valve which travels but a short distance in its opening and closing. It is free and disconnected from the solenoid plunger. It is actuated by the solenoid plunger to close, when the plunger is actuated by its control spring upon de-energization of the solenoid, but it is opened independently of the solenoid plunger when the plunger is moved out of the way.

A meritorious feature is that the construction is such, as hereinafter described, that the solenoid normally has to overcome only the differential in forces between the tension of the solenoid plunger spring and the fluid pressure acting upon the pilot valve element. The tension of the solenoid plunger spring may be adjusted so that such differential is very small and the power required to cause the solenoid to function is very small. The electrical power required to operate the solenoid plunger is small anyway, but as hereinabove set forth it may be very small.

Another object is the provision of a pilot valve assembly which includes a casing cored out to provide a cavity adapted to receive a pilot valve cartridge assembly. The casing is provided with fluid passageways leading to and from the cavity and adapted to communicate with the pilot valve cartridge assembly disposed within the cavity. This pilot valve cartridge assembly is sealed within the cavity and is coupled with the solenoid plunger to respond thereto. The pilot valve cartridge assembly is of such a character that in response to movement of the solenoid plunger, it functions to cause fluid under pressure to be delivered to the device to be actuated thereby or to place the device in communication with an exhaust line for the exhaust of such fluid therefrom, all as desired. The fluid will probably be air but other fluid might be used.

A meritorious feature is the provision of a cartridge assembly formed of simple, inexpensive component parts which are readily replaceable and therefore may be considered as expendable for very low cost.

A further object is the provision of the replaceable cartridge assembly of simple, inexpensive parts possessing specific meritorious features as hereinafter more particularly set forth.

Other objects, advantages, and meritorious features will more particularly appear from the following specification, claims, and accompanying drawings wherein:

FIG. 1 is a vertical sectional view through a solenoid and pilot valve assembly embodying the invention;

FIG. 2 is a top plan view of the construction shown in FIG. 1;

FIG. 3 is an enlarged vertical sectional view through the pilot valve casing and pilot valve cartridge assembly;

FIG. 4 is a horizontal sectional view taken on the line 4—4 of FIG. 1.

In the figures of the drawings the solenoid assembly is indicated in FIG. 1 by the numeral 10 and the pilot valve assembly is indicated in such figure by the numeral 12 and the part adapted to be actuated by the fluid under pressure passed through said pilot valve is indicated by the numeral 14.

The solenoid assembly 10 has a base 16 and an annular spacer 18 is seated upon the base. A coil assembly 20 of generally conventional construction is seated upon the spacer 18. This coil assembly has a liner 22 extending through the spool 24 and providing a passageway for the solenoid plunger 26. The solenoid plunger 26 is of a T-shaped contour and has a head portion 28. A spring 30 is interposed between the opposite end of the plunger and an adjusting screw 32, which is adjustable through the end of a cap 34. This cap 34 is received through an aperture in the cup-shaped housing 36 as shown in FIG. 1. Compressible cushion-like gasket elements 38 are interposed between the stator portion 40 of the solenoid and the top wall of the housing 36. The part 42 may be a clip spring received underneath the spool to hold the same upwardly. The numeral 44 indicates electric leads through the base of the solenoid to the coil winding. The base of the solenoid may be detachably secured to the pilot valve casing by studs 46 as shown in FIGS. 2 and 4.

The pilot valve casing is a suitable block of metal or the like indicated as 48 which is bored out as more particularly shown in FIG. 3 providing a cartridge receiving cavity exhibiting portions of different diameter as illustrated in FIG. 3. A fluid passageway 52, which is here shown as a fluid intake passageway, leads into the interior of such cavity at the bottom thereof. An intake pipe 53 is shown in FIG. 1 as communicating with this intake passageway 52. An exhaust passageway 54 is shown in FIGS. 1 and 3 as extending through this casing block and into the upper end of the cavity 50. A discharge passageway 56 is shown in FIGS. 1 and 3 as extending through this casing element 48 into an intermediate portion of the cavity 50. A fluid connecting pipe 57 is shown as communicating with the discharge passageway 56 and as leading to the part indicated as 14, which may be a valve, to actuate the same.

This pilot valve casing 48 provided with a cartridge receiving cavity 50 is adapted to be fitted with a cartridge assembly shown more particularly in FIG. 3. This cartridge assembly is formed of an assembly of cheap components which are easily assembled together and may be quickly discarded and replaced when worn and the cartridge assembly is readily replaceable within the cavity 50. It is held therein by a plug 58 which is shown as extending through the base 16 of the solenoid and terminating at its upper end in an annular portion 59. This plug 58 carries a shiftable plunger element 60, the upper end of which is adapted to engage the head of the solenoid plunger 26, and the lower end of which is adapted to engage the upper end of the stem of the pilot valve herein described and as shown in FIGS. 1 and 3. Due to the fact that when the solenoid plunger is projected downwardly by its spring 30, it actuates the plunger 60 and the plunger 60 closes the pilot valve before the head 28 of the solenoid plunger can engage the annular part 59 of the plug 58, such pilot valve will always close notwithstanding wear that may occur.

The pilot valve cartridge assembly, which is removably replaceable within the cavity 50 of the pilot valve casing 48 comprises an open-ended barrel portion 62 and two end closure plates adapted to close the open ends of the barrel. One end closure plate is indicated as 64. The other end closure plate is indicated as 66. End closure plate 64 has an annular flange portion 68 which is receivable within the open end of the barrel 62 as shown. End closure plate 66 has an annular flange portion 70 which is receivable within the adjacent open end of the barrel 62 as shown in FIG. 3. Each end closure plate has a marginal portion which projects beyond the side wall of the barrel and a sealing ring such as an O-ring 72 is adapted to be disposed between such marginal portion of the end closure plate and an adjacent shoulder of the cavity 50 to form a tight seal therewith in a manner well understood.

Each end closure plate is provided with a valve stem aperture therethrough. These valve stem apertures are aligned axially of the barrel portion of the cartridge as shown in FIG. 3. The valve stem aperture through the closure plate 64 is indicated as 74. The valve stem aperture through the closure plate 66 is indicated as 76. Each end closure plate has a boss projecting outwardly away from its outer face surrounding the valve stem aperture. This boss is provided with a valve stem passageway which forms a continuation of the valve stem aperture as shown in FIG. 3.

The boss on closure plate 64 is indicated as 78 and has a transverse passageway 80 extending entirely therethrough and communicating with the valve stem aperture through the boss. The boss provided on end closure plate 66 is indicated as 82 and has a transverse passageway 84 extending entirely therethrough and communicating with its valve stem aperture as shown. It will be seen that the portion of the valve stem passageway through each boss which is spaced outwardly beyond the transverse passageway through the boss is of less internal diameter than that portion of the valve stem passage way through the boss which communicates directly with the valve stem aperture through the end closure plate itself.

Each end closure plate is provided with a valve seat surrounding its valve stem aperture. The valve seat which surrounds the valve stem aperture 74 through the end closure plate 64 is indicated as 86. It is shown as being in the form of an internal boss projecting from the inner face of the end closure plate axially inwardly of the barrel and being of a stepped formation. The valve seat provided for the end closure plate 66 is of a similar construction to that provided for the end closure plate 64. This valve seat is indicated by the numeral 88 and it is shown with the valve seated thereupon.

The valve is of the poppet valve type. It comprises a valve stem 90 upon which is mounted a valve sealing element. The stem is of such a size that it is receivable through the valve stem apertures 74 and 76 and through their continuing passageways through the bosses 78 and 82. The interior diameter of the valve stem apertures 74 and 76 is substantially greater than the external diameter of the end portions of the valve stem so that a substantial fluid passageway is provided about the stem and this is true also of that portion of the valve stem passageway through each end boss which communicates directly with the valve stem aperture through the end closure plate.

The valve element itself is mounted upon the stem as shown. It may be secured thereto in the form of a tight slip fit or in any other suitable manner. It comprises a part 92 which exhibits on opposite ends cup-shaped portions 94. Within each of these cup-shaped portions is mounted a suitable compressible sealing member 96 which may be formed of urethane synthetic rubber or other suitable material. It will be noted that the margin of each cup-shaped portion 94 is spun over the end of the sealing element 96 holding it securely within the cup and against the bottom thereof. This element 96 is therefore held securely so that the impact pressure thereof against the valve seats will not cause it to expand radially or axially and there is no danger of its being lifted out of the cups due to fluid pressure acting thereupon.

In FIG. 3 a light spring member 98 is shown as seated at one end against the end closure plate 66 and at the opposite end against a flange 100 of the valve element 92 and which exerts limited pressure against the valve assembly tending to lift the same. Such spring 98 is, of course, overcome by the pressure of the solenoid spring 30 acting upon the valve stem through the solenoid plunger 26 and its cooperating plunger part 60 to close the valve, but assists the air pressure acting upon the valve to open the valve.

It will be noted also that the barrel 62 of the valve cartridge assembly is provided with a transverse passageway therethrough indicated as 102. This passageway 102 leads from the interior of the barrel into the casing cavity 50 between the end closure plates 64 and 66. It serves to place the interior of the valve cartridge assembly into communication with the discharge passageway 56 of the pilot valve casing 48 for the flow of fluid under pressure to the part 14 or from the part 14 to exhaust back through the valve cartridge assembly and out of the passageway 54 as hereinafter described in the description of the operation. It is understood that the part indicated as 14 might be any fluid actuated device and that the intake line 53 leads to any suitable source of fluid under pressure, such as air, and the exhaust line 54 might lead to the atmosphere or any suitable fluid reservoir.

In the operation of the device, the solenoid is shown in FIGS. 1 and 3 as de-energized. The solenoid plunger 26 and the associated plunger coupling 60 are held projected downwardly by the solenoid actuating spring 30. In this position the pilot valve is shown as seated upon the valve seat 88 closing the fluid passageway 76 through the end closure plate 66 so that fluid from whatever source entering the cavity through passageway 52 cannot enter the interior of the cartridge and flow to the part 14. In this position the discharge passageway 56 through the pilot valve casing communicates with the interior of the cartridge through the passageway 102 through the barrel 62 and air can exhaust outwardly from the interior of the barrel through the valve stem aperture 74 and transverse passageway 80 into the exhaust passageway 54.

When the solenoid is energized, the solenoid plunger 26 is lifted against the resistance of its spring 30. As the plunger is lifted, the fluid under pressure entering through the passageway 52 and valve stem aperture 76 lifts the valve from the valve seat 88 and urges it against the valve seat 86, sealing off the exhaust passageway 54 and placing the intake passageway 52 into communication with the discharge passageway 56 to actuate the device 14. It is not believed that the spring 98 is essential but it is shown for the purpose of providing a positive means of shifting the valve. The energization of the solenoid does not in and of itself shift the valve. It merely moves the solenoid plunger out of the way permitting the valve to be shifted.

It is apparent that by adjustment of the tension of the solenoid spring through the screw 32 or by providing solenoid springs of a proper tension to just overcome the fluid pressure that will be used it will be possible to provide a construction wherein the amount of energy required to overcome the resistance of its spring may be very small as, for example, as low as two watts. It is likewise apparent that with a lightweight construction such as this, a solenoid and pilot valve assembly may be built at low cost of lightweight, inexpensive parts which may be replaced at small cost.

What we claim is:

1. A pilot valve and solenoid assembly comprising, in combination, a solenoid having a reciprocable plunger shiftable in one direction upon energization of the solenoid, said plunger having an actuating spring coupled therewith and shiftable in the opposite direction by said spring upon de-energization of the solenoid, and a pilot valve communicating through an intake line with a source of fluid pressure and through a discharge line with a part to be actuated by fluid pressure, said pilot valve having an exhaust line leading therefrom, said pilot valve including reciprocable valve means responsive to be shifted in one direction by the solenoid plunger when the plunger is shifted by its spring to place the discharge line in communication with the exhaust line and to close the intake line, and responsive to be shifted in the opposite direction by fluid pressure from the source of fluid pressure when the solenoid plunger is withdrawn upon energization of the solenoid to place the discharge line in communication with the intake line and to close the exhaust line.

2. A pilot valve and solenoid assembly comprising, in combination, a solenoid having a reciprocable plunger shiftable in one direction upon energization of the solenoid, said plunger having an actuating spring coupled therewith and shiftable in the opposite direction by said spring upon de-energization of the solenoid, and a pilot valve communicating through an intake line with a source of fluid pressure and through a discharge line with a part to be actuated by fluid pressure, said pilot valve having an exhaust line leading therefrom, said pilot valve including reciprocable valve means responsive to be shifted in one direction by the solenoid plunger when the plunger is shifted by its spring to place the discharge line in communication with the exhaust line and to close the intake line, and responsive to be shifted in the opposite direction by fluid pressure when the solenoid plunger is withdrawn upon energization of the solenoid to place the discharge line in communication with the intake line and to close the exhaust line, and means for adjusting the spring tension of the plunger actuating spring.

3. In a solenoid pilot valve assembly, a solenoid having a reciprocable plunger provided with an actuating spring adapted to hold the plunger normally projected outwardly, a pilot valve having reciprocable valve means provided with a valve stem aligned with the solenoid plunger for actuation thereby, said pilot valve having a fluid intake line communicating with a source of fluid pressure to receive fluid under pressure therefrom and having a fluid discharge line communicating with a part to be actuated by fluid pressure to discharge fluid thereto and having a fluid exhaust line, said valve stem of the reciprocable valve means responsive to actuation by the solenoid plunger when the plunger is urged outwardly by its spring to close the intake line and place the discharge line in communication with the exhaust line, said valve means responsive to fluid pressure acting thereon from the source to cause to cause the valve means to follow the solenoid plunger when the plunger is withdrawn upon energization of the solenoid to place the intake line in communication with the discharge line and to close the exhaust line.

4. A pilot valve provided with reciprocable valve means, said valve adapted to be coupled with the reciprocable plunger of a solenoid whereby the valve means reciprocates in response to reciprocation of the plunger, said pilot valve comprising, in combination: a casing interiorly cored out providing a valve cartridge receiving cavity, a valve cartridge assembly removably received within said cavity, said cartridge assembly comprising an open-ended barrel portion and opposite end closure plates detachably received over the ends of the barrel portion, said end closure plates provided with correspondingly opposed valve stem apertures therethrough, each end closure plate provided upon its inner surface with a valve seat surrounding its valve stem aperture, a valve stem reciprocably supported within the barrel of the cartridge with the opposite end portions of the stem extending through the valve stem apertures in the end closure plates, said apertures being oversize the valve stem end portions extending therethrough providing fluid passageways thereabout, said stem provided with valve sealing means mounted thereupon within the barrel between the two end closure plates and having two oppositely facing sealing faces, one sealing face facing toward each end closure plate and adapted to close and seal against the valve seat surrounding the valve stem aperture through said closure plate; said casing provided with an intake opening leading into the cavity outwardly beyond one end closure plate and an exhaust opening leading from the cavity outwardly beyond the other closure plate, said casing also provided with a discharge opening leading from the cavity and opposite to an intermediate portion of the barrel spaced between the end closure plates, said barrel provided with a fluid passageway therethrough spaced between the end closure plates, said valve stem projecting at one end beyond an end closure plate and disposed for engagement with the end of the solenoid plunger when the pilot valve is coupled with the solenoid for response of the reciprocable valve means pursuant to reciprocation of the solenoid plunger.

5. A pilot valve as defined in claim 4 characterized in that the valve sealing means comprises a part fixed upon the valve stem which part has two cup-shaped portions facing toward the two opposite end closure plates of the valve cartridge, each cup-shaped portion provided with a compressible sealing member mounted therein and held in place therein and held upon the bottom of the cup-shaped portion by a part of the side wall of the cup-shaped portion, each sealing member adapted to be closed against the valve seat surrounding the valve stem aperture through the end closure plate facing said sealing member to seat the valve stem aperture.

6. A pilot valve as defined in claim 4 characterized in that each end closure plate is provided with a boss projecting away from the outer surface of the plate surrounding the valve stem aperture and having a valve stem passageway therethrough extending as a continuation of the valve stem aperture through the plate, said boss provided with a transverse fluid passageway therethrough communicating with the valve stem passageway through the boss, said valve stem passageway through the boss having a portion disposed outwardly beyond the transverse passageway of less diameter than the portion which communicates directly with the valve stem aperture through the end closure plate.

7. A pilot valve as defined in claim 4 characterized in that each end closure plate is provided with a boss projecting away from the outer surface of the plate surrounding the valve stem aperture and having a valve stem passageway therethrough extending as a continuation of the valve stem aperture through the plate, said boss provided with a transverse fluid passageway therethrough communicating with the valve stem passageway through the boss.

8. A pilot valve as defined in claim 4 characterized in that each end closure plate is provided with a boss projecting away from the outer surface of the plate surrounding the valve stem aperture and having a valve stem passageway therethrough extending as a continuation of the valve stem aperture through the plate, said boss provided with a transverse fluid passageway therethrough communicating with the valve stem passageway through the boss, each end closure plate further characterized in that it is provided with an annular flange which projects normally away from the inner surface of the plate and which flange is of a size and shape to be removably received within the open end of the barrel portion of the cartridge, and each end closure plate further characterized in that it has a marginal portion which projects outwardly radially beyond the barrel portion of the cartridge and sealing means is disposed between each end closure plate and the adjacent wall of the cartridge receiving cavity within the casing.

9. A pilot valve as defined in claim 4 characterized in that the valve sealing means mounted upon the stem comprises a part fixed upon the valve stem which part has two cup-shaped portions facing toward the two opposite end closure plates of the valve cartridge, each cup-shaped portion being provided with a compressible sealing member mounted therein and held in place upon the bottom of the cup-shaped portion by a part of the side wall of the cup-shaped portion, each sealing member adapted to be closed against the valve seat surrounding the valve stem aperture through the end closure plate facing said sealing member to seal the valve stem aperture, and characterized further in that each valve seat is in the form of a boss projecting inwardly axially of the barrel away from the inner face of an end closure plate and the external diameter of said boss is less than the internal diameter of the adjacent cup-shaped portion of the valve sealing means, and a spring is provided interposed between one end closure plate and the part provided with the two cup-shaped portions holding said part yieldingly toward the opposite end closure plate.

10. A cartridge assembly for a pilot valve comprising, in combination, a cylindrical open-ended barrel portion, two end closure plates detachably engageable with opposite ends of said barrel portion, each end closure plate having a valve stem aperture therethrough, said apertures being aligned axially of the barrel when the end closure plates are attached to the barrel, each end closure plate provided on its inner face with a valve seat surrounding the valve stem aperture, said valve seat projecting axially inwardly of the barrel away from the inner face of the end closure plate, a valve stem reciprocably disposed within the barrel having opposite end portions projecting through the valve stem apertures of the closure plates and being of a size less than the valve stem apertures providing a fluid passageway around each end portion of the stem through the end closure plate, a valve mounted on the stem comprising a part provided with two outwardly opening cup-shaped portions facing the valve seats of the two end closure plates and having an interior diameter greater than the external diameter of the valve seats, each cup-shaped portion provided with a sealing member disposed therein and having a diameter sufficiently large that the sealing member closes upon and seals against the adjacent valve seat, the margin of the wall of each cup-shaped portion being crimped inwardly over the sealing member holding the same in place and against the bottom of the cup-shaped portion, said barrel having a passageway through its wall spaced between the end closure plates.

11. A cartridge assembly for a pilot valve comprising, in combination, a cylindrical open-ended barrel portion, two end closure plates closing the opposite ends of said barrel portion, each end closure plate having a valve stem aperture therethrough, a valve reciprocably disposed within the barrel portion having a valve stem projecting through the valve stem apertures of the end closure plates and being of a size less than the valve stem apertures providing a fluid passageway through each aperture around the valve stem, said valve having a cylindrical part mounted upon the stem and having an external diameter less than the internal diameter of the barrel providing a fluid passageway about said part, said part having compressible sealing members secured to opposite ends thereof opposed to the two end closure plates, each end closure plate provided with a valve seat surrounding the valve stem aperture through the plate and opposed to the adjacent sealing member of said part, said barrel having a fluid passageway through its wall spaced between the end closure plates.

12. A cartridge assembly for a pilot valve comprising, in combination, a cylindrical barrel portion having opposed end portions provided with aligned valve stem apertures therethrough, a valve reciprocably disposed within the barrel having a valve stem the opposite ends of which project through said apertures, each end of the barrel provided with a valve seat surrounding its stem aperture, a valve reciprocably mounted within the barrel having a stem projecting through said stem apertures, said valve having an external diameter less than the internal diameter of the barrel providing a fluid passageway thereabout between opposite ends of the barrel, said valve having opposed valve sealing faces opposed to the valve seats and adapted to close thereupon and seal thereagainst, the valve stem aperture in each end of the barrel being oversize, the valve stem extending therethrough sufficient to provide a fluid passageway about the stem, the side wall of the barrel intermediate said ends provided with a fluid passageway therethrough.

13. A pilot valve and solenoid assembly comprising, in combination, a solenoid having a reciprocable plunger shiftable in one direction upon energization of the solenoid, said plunger having actuating mechanism coupled therewith and shiftable in the opposite direction by said mechanism upon deenergization of the solenoid, and a pilot valve communicating through an intake line with a source of fluid pressure and through a discharge line with a part to be actuated by fluid pressure, said pilot valve having an exhaust line leading therefrom, said pilot valve including reciprocable valve means coupled with the solenoid plunger and operable to be shifted thereby in one direction when the plunger is shifted by said plunger actuating mechanism to place the intake line in communication with the discharge line and operable to be shifted in the opposite direction by fluid pressure from the source of fluid pressure when the solenoid plunger is withdrawn upon energization of the solenoid to place the discharge line in communication with the exhaust line.

14. A pilot valve and solenoid assembly comprising, in combination, a solenoid having a reciprocable plunger shiftable upon energization of the solenoid, said plunger having spring means coupled therewith and shiftable in the opposite direction by said means upon de-energization of the solenoid; and a pilot valve assembly including a pilot valve chamber and a pilot valve therein, said chamber communicating through an intake line with a source of fluid pressure to receive fluid under pressure therefrom and through a discharge line with a part to be actuated by fluid pressure to discharge fluid under pressure thereto and to receive fluid therefrom, said pilot valve chamber having an exhaust line leading therefrom to the atmosphere; said pilot valve reciprocably disposed within the valve chamber and coupled with the solenoid plunger to be shifted in one direction thereby within the chamber, said valve operable to be shifted in the opposite direction within the chamber by fluid pressure from the source of fluid pressure to follow the solenoid plunger when said plunger is shifted in such opposite direction upon energization of the solenoid; said pilot valve operable when shifted in one direction within the chamber by the solenoid plunger to close the intake line into the chamber and to place the discharge line into communication with the exhaust line through the chamber and operable when shifted in the opposite direction within the chamber by the action of fluid pressure therefrom to close the exhaust line from the chamber and to place the discharge line in communication with the intake line through the chamber.

References Cited in the file of this patent

UNITED STATES PATENTS

| | | |
|---|---|---|
| 2,617,444 | Gardner | Nov. 11, 1952 |
| 2,658,523 | Johnson | Nov. 10, 1953 |
| 2,754,840 | Hicks | July 17, 1956 |